(12) United States Patent
Kendrick et al.

(10) Patent No.: US 7,092,103 B1
(45) Date of Patent: Aug. 15, 2006

(54) PHASE DIVERSITY METHOD AND APPARATUS USING FOURIER TRANSFORM SPECTROSCOPY

(75) Inventors: Richard Lee Kendrick, Foster City, CA (US); Eric H. Smith, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 300 days.

(21) Appl. No.: 10/821,714

(22) Filed: Apr. 9, 2004

(51) Int. Cl.
*G01B 9/02* (2006.01)

(52) U.S. Cl. .................................... 356/497; 356/456
(58) Field of Classification Search ................ 356/485, 356/496, 497, 498, 512, 452, 451, 454
See application file for complete search history.

(56) References Cited

U.S. PATENT DOCUMENTS

| | | | |
|---|---|---|---|
| 5,404,221 A | 4/1995 | De Groot | |
| 5,610,707 A | 3/1997 | Duncan et al. | |
| 5,905,591 A | 5/1999 | Duncan et al. | |

OTHER PUBLICATIONS

Lampe, Lutz H.J., et al., "Noncoherent Continuous-Phase Modulation for DS-CDMA", no date.
Gonsalves, Robert A., "Phase Retrieval and Diversity in Adaptive Optics", Optical Engineering, vol. 21, No. 5, Sep./Oct. 1982.

*Primary Examiner*—Hwa (Andrew) Lee
*Assistant Examiner*—Denise B. Anderson
(74) *Attorney, Agent, or Firm*—McDermott Will & Emery

(57) ABSTRACT

A method for reducing a piston between a plurality of optical-collection devices configured to operate as a single optical device, such that the optical-collection devices are configured to capture select portions of a wavefront. The method includes pistoning an adjustable-optical path of at least one of the optical-collection devices through a plurality of steps; collecting a set of focused images and a set of defocused images for each step; Fourier transforming the first and second sets of images to generate respective first and second sets of spectral information for the wavefronts; deriving a set of wavefront errors based on the first and second sets of spectral information using a phase diversity algorithm; and deriving a piston value for the piston from the wavefront errors using a multi-color interferometry algorithm.

25 Claims, 10 Drawing Sheets

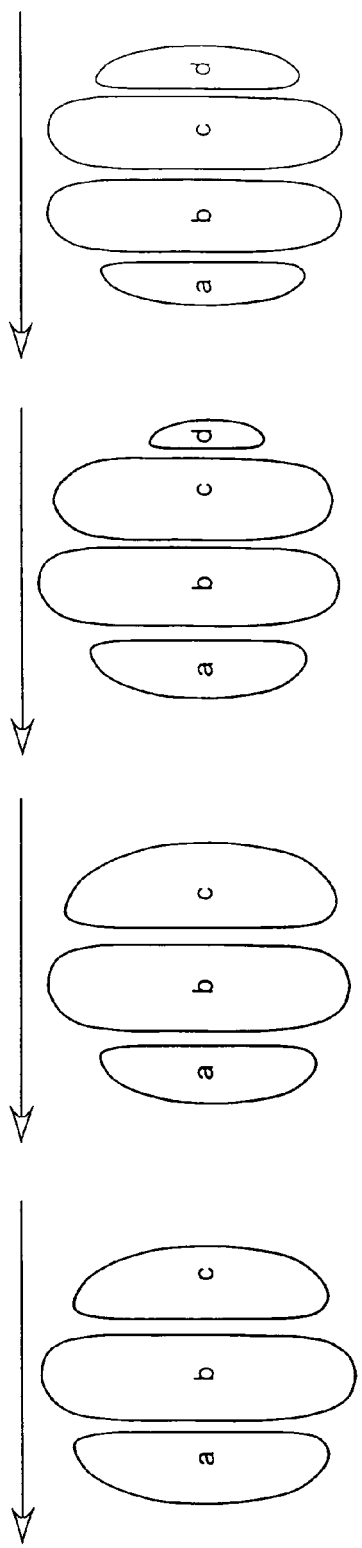
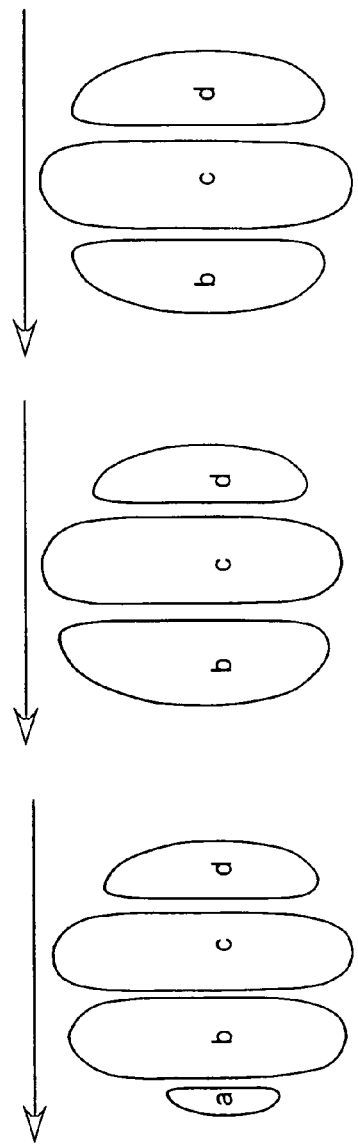

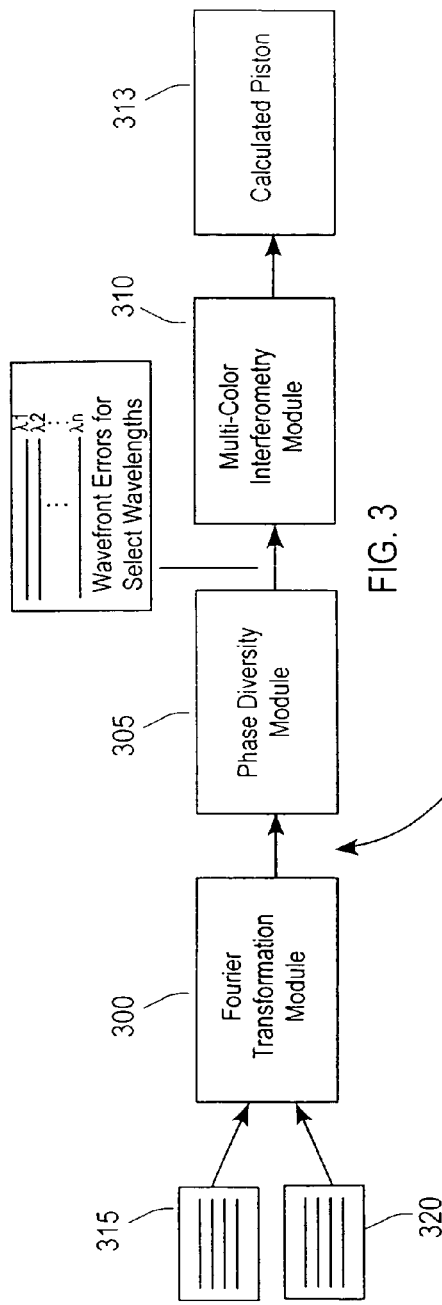
FIG. 3
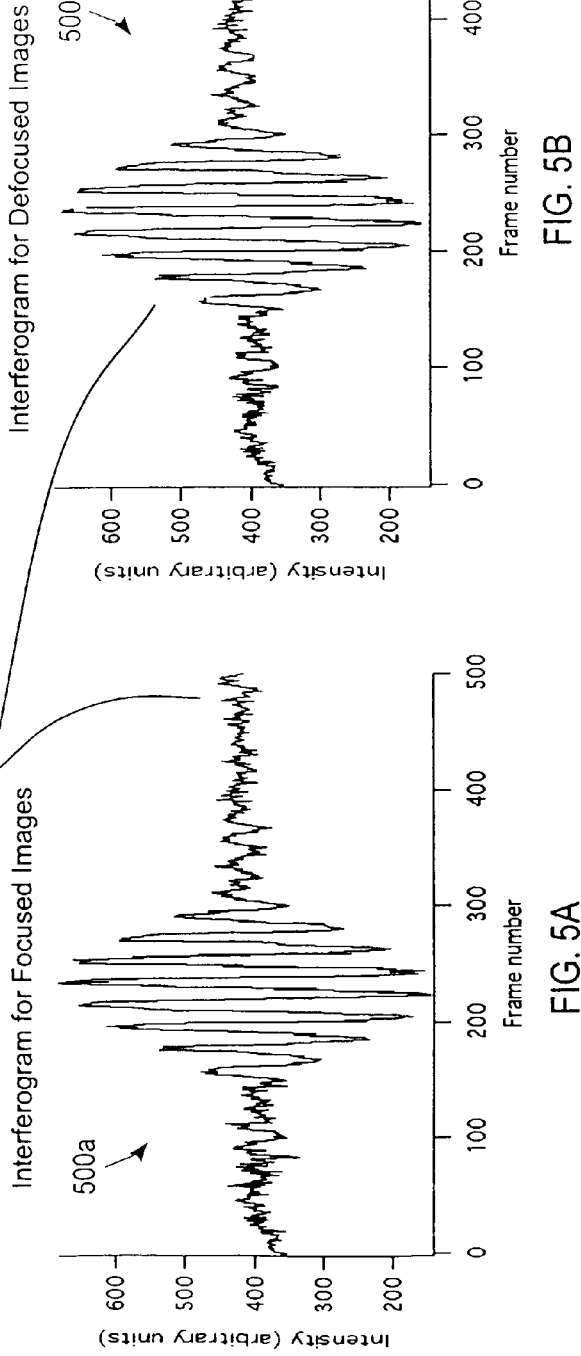
FIG. 5A
FIG. 5B

Power Metrics (PM) calculated using the real part of the FTS data. The difference between the perfectly phased telescope and a de-phased telescope power metrics is shown. The top row is de-phased by 5 waves at 425 nm and the bottom row is de-phased by 4 waves at 425 nm.

PHASE DIVERSITY METHOD AND APPARATUS USING FOURIER TRANSFORM SPECTROSCOPY

BACKGROUND OF THE INVENTION

The present invention relates to optical systems. More particularly the present invention relates to an apparatus and method for calculating a piston between segmented optics, such that the piston is larger than the wavelengths of electromagnetic radiation collected by the segmented optics.

The next generation of space-based telescopes are aimed to follow trends of modern terrestrial telescopes in that the collector optics will likely be segmented. Modern terrestrial based telescopes, such as the twin Keck Telescopes on Hawaii's Mauna Kea, have segmented primary mirrors to reduce the weight of the primary mirrors. Segmented mirrors in general may be made relatively lighter than monolithic mirrors of similar size. Providing segmented mirrors that are relatively lightweight reduces problems associated with the mirrors becoming misshapen under their own weight.

Manufacturers of space-based telescopes have similar goals in providing telescopes with segmented optics that are relatively lightweight. The motivations of these manufacturers, however, lie less in reducing flexure in the optical systems and lie more in providing telescopes that are inexpensive to launch (i.e., light weight), that have relatively large primary apertures, and that are foldable to fit into conventional space launch vehicles. One type of space based segmented optics telescopes include multi-aperture telescopes or extended-aperture telescopes. Each sub-aperture telescope of a multi-aperture telescope is configured to collect a select portion of a wavefront. The select wavefront portions are typically transmitted from the sub-aperture telescopes to a beam combiner where the select wavefronts are combined to form an image of the object or scene that generated the wavefronts.

Of concern in both terrestrial based telescopes and spaced based telescopes that have segmented optics are piston displacements between the segments. In a multi-aperture telescope, piston displacements equate to at least one sub-aperture telescope being out of phase with other sub-aperture telescopes. Piston displacement between sub-aperture telescopes introduces aberrations into images formed by the multi-aperture telescope.

Several techniques have been proposed to reduce piston in multi-aperture telescopes including various phase retrieval and phase diversity techniques that provide phase front information for collected wavefronts. From the phase front information, information of the relative piston between sub-aperture telescopes may be derived. For example, collected phase front information may indicate a given sub-aperture telescope is a half-wavelength (half-wavelength of collected electromagnetic radiation) advanced or retarded with respect other sub-aperture telescopes. Traditional phase diversity techniques, however, often do not provide piston information greater than one wavelength of collected radiation. For example, a relative displacement of two and a half wavelengths between sub-aperture telescopes would be indicated as a half-wavelength displacement using traditional phase diversity techniques. Accordingly, reducing relative piston greater than a wavelength of collected radiation tends to be complicated.

Accordingly, new techniques and apparatus are needed that provide for simplified phasing of a segmented optical system, wherein a piston between the optical segments exceeds the wavelengths of collected radiation.

BRIEF SUMMARY OF THE INVENTION

The present invention provides an optical system. More particularly the present invention provides an apparatus and method for calculating a piston between segmented optics, such that the piston is larger than the wavelengths of electromagnetic radiation collected by the segmented optics.

According to one embodiment, a method is provided for reducing a piston of a plurality of optical-collection devices. The method includes pistoning an adjustable-optical path of at least one of the optical-collection devices through a plurality of steps; collecting a set of focused images and a set of defocused images for each step; Fourier transforming the first and second sets of images to generate respective first and second sets of spectral information for the wavefronts; deriving a set of wavefront errors based on the first and second sets of spectral information using a phase diversity algorithm; and deriving a piston value for the piston from the wavefront errors using a multi-color interferometry algorithm. According to a specific embodiment, the method further includes reducing the piston of the optical-collection devices based on the piston value. Each of the wavefront errors is associated with a select wavelength of the wavefronts. The set of wavefront errors includes at least first and second wavefront errors respectively associated with first and second wavelengths of the wavefronts. The first and second wavelengths are less than the piston.

According to another embodiment, the method includes pistoning an adjustable-optical path of at least one of the optical-collection devices through a plurality of steps; collecting a set of focused images and a set of defocused images for each of the steps; Fourier transforming the first and second sets of images to derive respective first and second sets of spectral information for the wavefronts; generating a plurality of visible indicators of the displacement from the first and second sets of spectral information using a metric; and interpreting the visible indicators to determine a value for the displacement, the value for the displacement referred to as a displacement value. According to a specific embodiment, the method further includes calculating the metric for a wavelength value associated with each of the steps. According to anther specific embodiment, the displacement is indicated by a uniform-visible indicator. According to another specific embodiment, the method further includes performing pattern recognition on the visible indictors to determine the uniform-visible indicator. According to another specific embodiment, the metric is a power metric.

According to another embodiment, a multi-aperture telescope is provided that includes a plurality of sub-aperture telescopes, wherein at least one of the sub-aperture telescopes has an adjustable-optical path; a Fourier transform module configured to transform focused and defocused image information collected by the sub-aperture telescopes and to generate spectral information from the focused and defocused image information; a phase diversity module configured to derive wavefront errors from the focused and defocused image information; wherein the wavefront errors are associated with select wavelengths collected by the sub-aperture telescopes; and a multi-color interferometry module configured to derive a displacement value indicative of a displacement between at least first and second sub-aperture telescopes of the plurality of sub-aperture telescopes.

Numerous benefits may be achieved using the present invention over conventional techniques. For example, the invention provides for the phasing of optical-collection devices having a piston that is greater than the wavelengths of radiation collected by the optical-collection devices. Therefore, ambiguity of resolving a piston greater than the wavelengths of collected radiation is resolved. The invention further provides numerical and visual inspection techniques for calculating piston values that may be used to reduce the phase the optical-collection devices. Techniques of the present invention are applicable to a number of multi-aperture devices, such as multi-aperture telescopes and devices having segmented optics, such as telescopes having segmented primary mirrors These and other benefits are described throughout the present specification and more particularly below.

A further understanding of the nature and advantages of the present invention may be realized by reference to the remaining portions of the specification and the drawings.

BRIEF DESCRIPTION OF THE DRAWINGS

FIG. 3 is a simplified diagram of a computation module according to an embodiment of the present invention;

FIGS. 4A–4G show a time ordered sequence of events of fringes of an interference patter sweeping across an image-capture array;

FIGS. 5A and 5B are intensity profiles for sets of focused and defocused images;

DETAILED DESCRIPTION OF THE INVENTION

The present invention provides an optical system. More particularly the present invention particularly provides an apparatus and method for calculating a piston between segmented optics, such that the piston is larger than the wavelengths of electromagnetic radiation collected by the segmented optics.

Figure 1A:
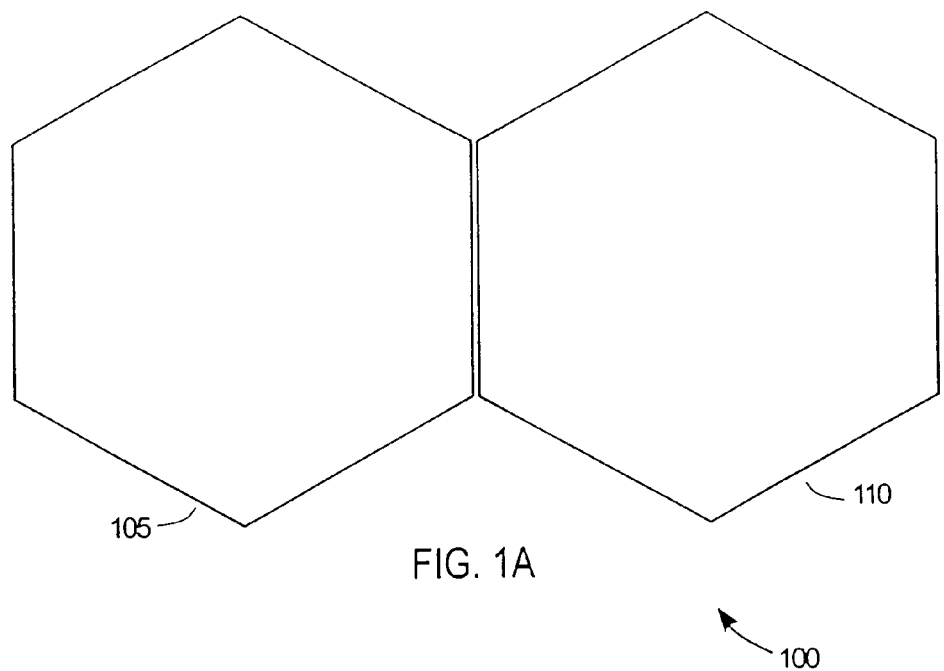
FIGS. 1A and 1B are simplified cross-sectional views and side views, respectively, of a segmented optical device having a non-zero piston "p" between first and second optical segments.
Figure 1B:
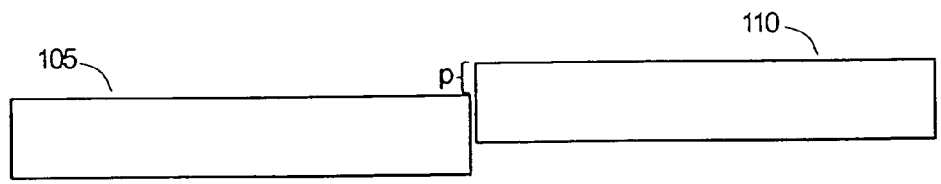

Embodiments of the present invention are best understood by first describing a brief overview of phasing, second describing an optical system having segmented optics and a computation module configured to calculate a piston between the segmented optics; and third describing a method for calculating the piston. The term piston as used herein refers to a displacement of the surfaces of segmented optical elements with respect to each other. Piston between optical segments introduces undesired aberration into images formed by optical segments. The aberration may be reduced by phasing the optical segments. The term phasing as used herein, refers generally to reducing the piston between the surfaces of the optical segments to form, for example, a desired shape (e.g., parabolic) from the surfaces of the segmented optical elements. FIGS. 1A and 1B are simplified cross-sectional views and side views, respectively, of a segmented optical device 100 having a non-zero piston "p" between first and second optical segments 105 and 110, respectively. Optical segments 105 and 110 may be segments of a primary mirror of a telescope or the like. A desired shape of the optical segments may be a parabolic shape or other useful shape. During a phasing process the piston between surfaces of the optical segments is iteratively measured as translation devices (e.g., piezoelectrics, solenoids, etc.) coupled to the optical segments are manipulated to reduce the piston. Embodiments of the present invention are directed toward such problems, as well as others, and are described in detail below.

Figure 2A:
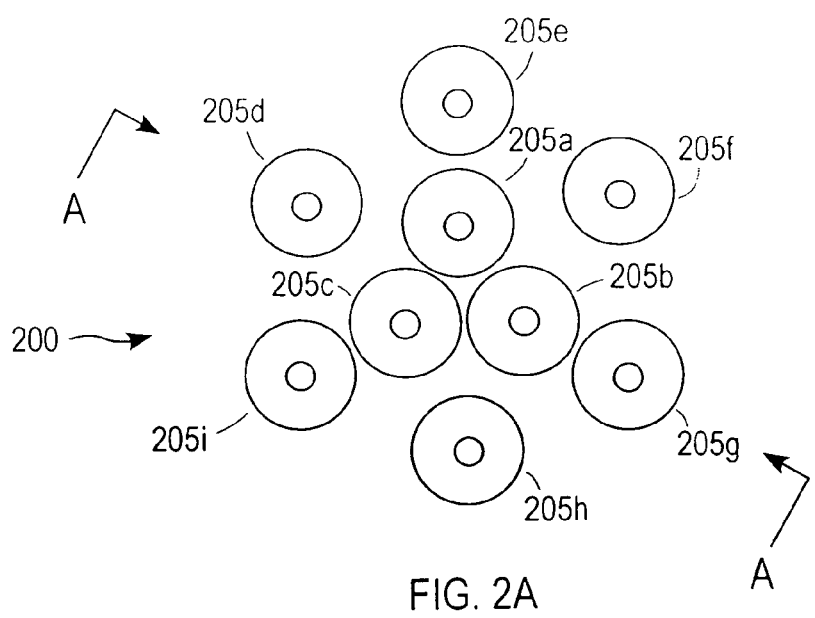
FIGS. 2A and 2B are top and cross-sectional views of an optical system according to an embodiment of the present invention.
Figure 2B:
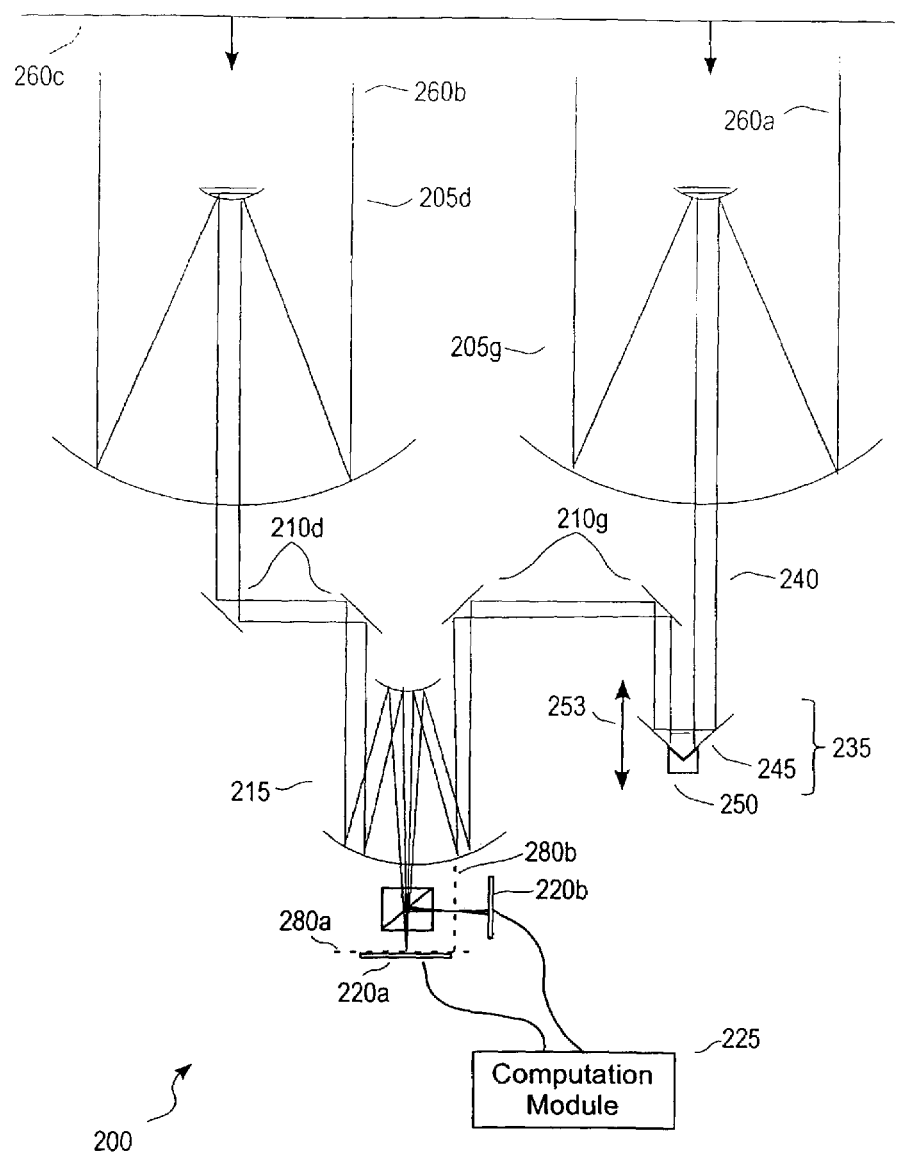

FIGS. 2A and 2B are top and cross-sectional views of an optical system 200 according to an embodiment of the present invention. According to one embodiment, optical system 200 is an extended aperture telescope and includes a number of optical-collection devices (e.g., sub-aperture telescopes) labeled with reference numbers 205a–205i. It should be understood that optical system 200 is an exemplary embodiment an optical system and that other optical systems having different configurations may be used to implement embodiments of the present invention. For example, while optical system 200 is shown to include nine sub-aperture telescopes, embodiments of the present invention may include more or fewer than nine sub-aperture telescopes and may include a telescope having a single aperture with segmented elements, such as the segmented elements forming a segmented primary mirror. Optical-collection devices 205d and 205g are shown in the cross-sectional view in FIG. 2B. The cross-section view of the optical collection devices shown in FIG. 2B, may be along line A—A in FIG. 2A. For convenience, optical-collection device 205b is not shown in FIG. 2B. Optical system 200 further includes a number of steering mechanisms (two steering mechanisms are shown in FIG. 2B and are labeled reference numbers 210d and 210g), combiner optics 215, image-capture arrays 220a and 220b, and a computation module 225.

Each optical-collection device 205a–205i is configured to collect a select portion (e.g., 260a and 260b) of an electromagnetic wavefront 260c and transmit the collected electromagnetic radiation to steering mechanisms 210. Collected electromagnetic radiation may include infrared radiation, light, ultraviolet radiation or radiation having other wavelengths. The collected electromagnetic radiation may be from point sources for extended scenes. The steering mechanisms are configured to steer the electromagnetic radiation to combiner optics 215. Combiner optics 215 may form a telescope type device and are configured to combine the collected electromagnetic radiation and form images on the image-capture arrays 220a and 220b. Each image-capture array may be a charge coupled device (CCD) array, complimentary metal oxide (CMOS) array or the like.

Piston between optical-collection devices 205a–205i introduces aberrations into images formed by optical system 200. To reduce the piston and thereby reduce aberration, computation module 225 is configured to calculate phase errors from images collected by the optical-collection devices and to calculate the piston from the phase errors. Computation module 225 may also be configured to use the calculated piston to control phasing of the optical-collection devices. Computation module 225 is discussed in detail below.

According to one embodiment, the optical-collection devices are phased by translating an optical-path-delay mechanism 235 to vary an adjustable optical path 240. According to some embodiments, one or more optical-collection devices may have optical-path-delay mechanisms, such as optical-path-delay mechanism 235. Optical-path-delay mechanism 235 may include a reflection device 245, such as a pair of reflective flats, a rooftop prism or the like, and may further include a translation device 250 that is configured to translate the reflection device to vary the path length of adjustable optical path 240. Translation device may be configured to translate the reflection device along the optical path 240, such as shown by arrow 253. Translation device 250 may include, for example, a piezoelectric device, a solenoid or the like. According to one embodiment, translation device 250 is computer controlled by computation module 225.

FIG. 3 is a simplified diagram of a computation module 225 according to an embodiment of the present invention. Computation module 225 includes a Fourier transform module 300, a phase diversity module 305, and a multi-color interferometry module 310. As briefly described above, computation module 225 is configured to calculate a piston 313 from images of interference patterns collected by image capture devices 220a and 220b.

Piston calculation is presently described in detail. For convenience, FIGS. 2A–2B and 3 will be collectively referred to in the following discussion. According to one embodiment, Fourier transform module 300 is configured to receive a plurality of focused images 315 collected by image-capture array 220a and a plurality of defocused images 320 collected by image-capture array 220b. Image-capture array 220a may be disposed at an image plane 280a to collect focused images 320, whereas image-capture array 220b may be disposed a select distance from an image plane 280b to collect defocused images 325. While image-capture array 220b is shown to be disposed behind image plane 280b, this is not necessary; the image-capture array may be disposed before the image plane. The amount of defocus in the defocused images is known.

Each of the focused images corresponds respectively to one of the defocused images. Focused images 215 and defocused images 220 are collected with optical-path-delay mechanism 235 stepped through a number of positions. That is, for each focused image and its associated defocused image, the adjustable optical path 240 is set to a unique path length. Translation device 250 may be configured to translate optical-path-delay mechanism 245 a number of centimeters, a number of microns, or a number of nanometers in sub-angstrom, angstrom, nanometer or larger steps.

Focused images 315 include focused images of interference patterns formed at image-capture array 220a, and defocused images 320 includes defocused images of defocused interference patterns formed at image-capture array 220b. As the adjustable optical path length is varied, fringes of the interference patterns sweep across pixels of the image-capture arrays. FIGS. 4A–4G show a time ordered sequence of events of fringes a, b, c, and d as the fringes are sweep across an image-capture array as the variable-optical path is changed. Fringes a, b, c, and d may represent focused or defocused fringes that are respectively sweep across image-capture array 220a or 220b. As the fringes sweep across the pixels of the image-capture arrays, intensity profiles 500a and 500b (see FIGS. 5A and 5B) are collected from the fringes. It is noted that intensity profiles are sometime referred to in the art as interferograms or fringe packets. Intensity profiles 500a and 500b may represent, for example, the varying intensity of electromagnetic radiation collected by unique pixels of the image-capture arrays as the fringes sweep across the pixels.

Figure 6:
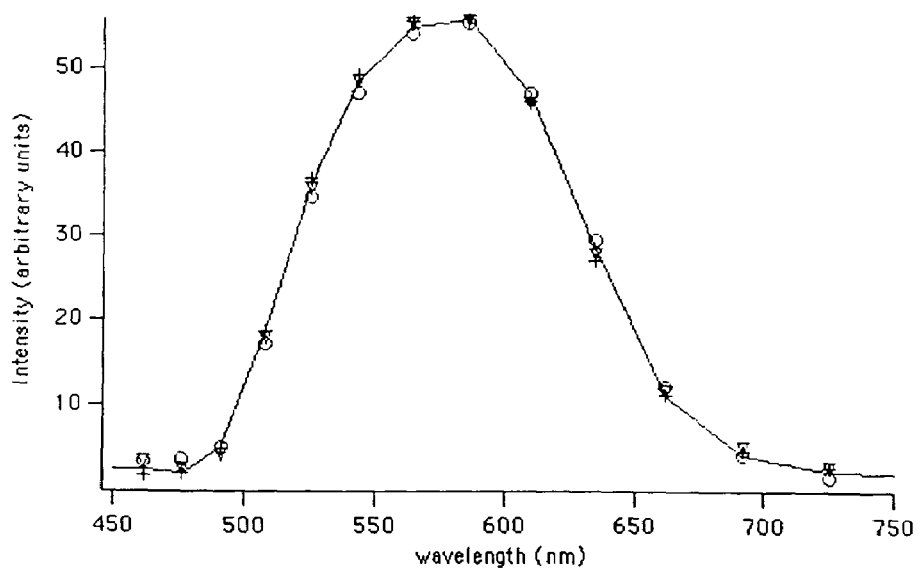
FIG. 6 is an example of spectral data generated by the Fourier transform module.

According to one embodiment, Fourier transform module 300 is configured to Fourier transform intensity profiles for the focused fringes and generate a first set of spectral data, and is configured to Fourier transform intensity profiles for the defocused images and generate a second set of spectral data. An example of spectral data generated by Fourier transform module 300 is shown in FIG. 6.

Subsequent to the generation of the first and second sets of spectral data, the spectral data is transferred to phase diversity module 305. Phase diversity module 305 is configured to perform a phase diversity calculation to generate wavefront errors (sometimes referred to in the art as phase errors or phase front errors) from the spectral data. Each wavefront error generated by the phase diversity module 305 is associated with a single frequency (or wavelength) of the collected electromagnetic radiation 260. According to one embodiment, phase diversity module 305 is configured to extract from the spectral intensity data, spectral intensity data for at least a first wavelength $\lambda_1$ and a second wavelength $\lambda_2$ of the collected electromagnetic radiation. From the spectral intensity data for the first wavelength $\lambda_1$, the phase diversity module is configured to generate a first set of wavefront errors. From the spectral intensity data for the second wavelength $\lambda_2$, the phase diversity module is configured to generate a second set of wavefront errors. Numerous phase diversity algorithms are known to those of skill in the art that may be used to generate the wavefront errors. According to one embodiment, the phase diversity algorithms described in Duncan et al., U.S. Pat. No. 5,610,707, which is incorporated herein in its entirety by reference, may be used to generate the wavefront errors. According to another embodiment, the phase diversity algorithms described in "Phase Retrieval and Diversity in Adaptive Optics," Optical Engineering, September/October 1982, Vol. 21, No. 5, pages 829–832, of Gonsalves, which is incorporated by reference herein in its entirety. The phase diversity algorithms described the article "Phase Retrieval and Diversity in Adaptive Optics" are referred to herein as the Gonsalves's algorithm or the method of Gonsalves. While the above-described embodiment includes the generation of first and second set of wavefront errors for respective first and second wavelengths, according to other embodiment, more than two sets of wavefront errors may be generated for a corresponding number of wavelengths.

According to one embodiment, multi-color interferometry module 310 is configured to receive the generated wavefront errors from phase diversity module 305 and calculate a piston between the surfaces of one or more optical-collection devices 205, such as between surfaces of optical-collection devices 205d and 205g. According to one embodiment, multi-color interferometry module 310 is configured to perform a multi-color interferometry calculation using the first and second wavefront errors to calculate the piston, and to express the calculated piston in terms of a synthetic wavelength $\Lambda$. The synthetic wavelength $\Lambda$ is a function of the first wavelength $\lambda_1$ and the second wavelength 2 and may be expressed as $\Lambda=\lambda_1\lambda_2/(\lambda_1-\lambda_2)$. The synthetic phase $\Phi$ of the synthetic wavelength is a function of the phase $\phi_1$ of $\lambda_1$ and the phase $\phi_2$ of $\lambda_2$ and may be expressed as $\Phi=\phi_1-\phi_2$. And the piston "p" may be expressed in terms of the synthetic wavelength and synthetic phase as $p=(N+\Phi/2\pi)\Lambda$, wherein N is a synthetic-integer fringe and $\Phi$ is normalized from 1 to −1. For the unambiguous fringe range of the synthetic wavelength, N is zero. For N=0, the piston p may be recast in term of $\lambda_1$, $\lambda_2$, $\phi_1$, and $\phi_2$ and thereby the piston may be associated with fringe orders, such as those shown in FIGS. 4A–4G. The piston may be recast as $p=[(1/2\pi)(\Phi\Lambda/\lambda_1-\phi_1)+\phi_1/2\pi)]\lambda_1$. As the denominator $[(1/2\pi)(\Phi\Lambda/\lambda_1-\phi_1)]$ for the first term of this equation is greater than 0, pistons greater than $\lambda_1$ may be resolved. Because pistons greater than collected wavelengths may be resolved, pistons greater than collected wavelengths may be phased. While the foregoing describes an embodiment using two wavefront errors, having two associated wavelengths $\lambda_1$, and $\lambda_2$, to calculate the piston in terms of a synthetic wavelength, other embodiments may use more than two wavefront errors having a corresponding number of associated wavelengths to calculate the piston. For example, three wavefront errors associated with three wavelengths $\lambda_1$, $\lambda_2$, and, $\lambda_3$ may be used by multi-color interferometry module 310 to calculate the piston. For a further understanding of multi-color interferometry techniques see, for example, the text *Principles of Optics* by M. Born and E. Wolf, Pergamon Press, copyright 1987, at pages 286–409, which discusses a traditional exact fractions method of multi-color interferometry, which pages are incorporated by reference herein in their entirety. See also, Contour Generation By Wavefront Reconstruction, by K. Haines and B. P. Hildebrands, 19 Physics Letters 10–11 (1965), which pages are incorporated by reference herein in their entirety. See also, Analytical Procedure For Determining Lengths From Fractional Fringes, by Charles R. Tilford, Applied Optics, July 1977, vol. 16, No. 7, which pages are incorporated by reference herein in their entirety. See also, U.S. Pat. No. 4,355,899, issued Oct. 26, 1982, of Nussmeier, titled Interferometric distance measurement method, which is incorporated by reference herein in its entirety.

Figure 7:
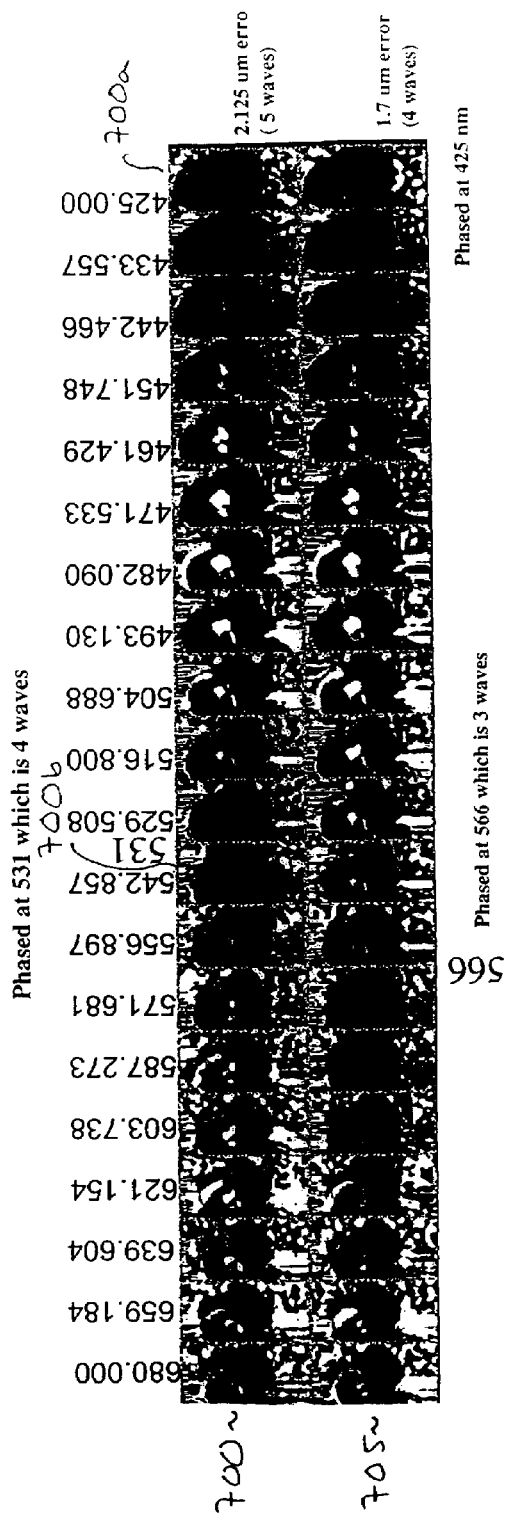
FIG. 7 is a diagram of visible indicators generated from a power metric calculation that indicate an amount of piston for at least two optical-collection devices.

According to another embodiment, phase diversity module 305 is configured to generate a number of visible indicators that indicate phasing of pistoned optical-collection devices (e.g., sub-aperture telescopes, segmented primary mirrors and the like). The visible indicators are calculated from a metric, such as the power metric. The power metric may use real portions of the spectral data generated by Fourier transform module 300 to generate the visible indicators. FIG. 7 is a diagram of visible indicators 700 and 705 that may be generated by the phase diversity module and that indicate phasing of pistoned optical-collection devices. Visible indicators that appear relatively uniform in appearance, provide piston information for the optical-collection devices. For example, visible indicators 700*a* and 700*b* in the top row of indicators have an approximately uniform visible appearance. Specifically, visible indicators that have a relatively uniform shade (relatively small amounts of lighter and darker regions) are said to have a relatively uniform visible appearance. Each visible indicator is associated with a relative displacement of optical-path-delay mechanisms 235. That is, the power metric may be calculated for each wavelength associated with each step of optical-path-delay mechanism 235. The relative displacements are indicated by wavelengths of displacement above the visible indicators in FIG. 7. The wavelengths of displacements at visible indicators that have relatively uniform visible appearance indicate the piston of the optical-collection device. For example, visible indicator 700*a* in the top row indicates an amount of de-phase of 5 waves at 425 nanometers and visible indicator 700*b* indicates that the collector devices are phased at 531 nanometers of displacement of the optical-path-delay mechanisms. 531 nanometers of displacement is 4 waves. So the total piston is 2.125 micrometers. Similar to embodiments described above, a piston greater than collected wavelengths may be detected and corrected. The power metric "Mp" may be expressed as Mp=(G0*G0−Gd*Gd)/(G0*G0+Gd*Gd), wherein G0 is a Fourier transform of an image function for the focused images and Gd is a Fourier transform of an image function for the defocused images. The image function is the convolution of the object function and optical system point spread function. Metrics other than the power metric may be used. Such metrics will be readily apparent to those of skill in the art after review of the instant description. According to one embodiment, detection of the relatively uniform visible indicators may be automated, for example, by using a pattern recognizer to determine which of the visible indicators are relatively uniform. With a pattern recognizer, phasing may be automated and the piston may be automatically monitored and adjusted, for example, in an uninterrupted (or continuous manner) as a telescope is used.

Figure 8:
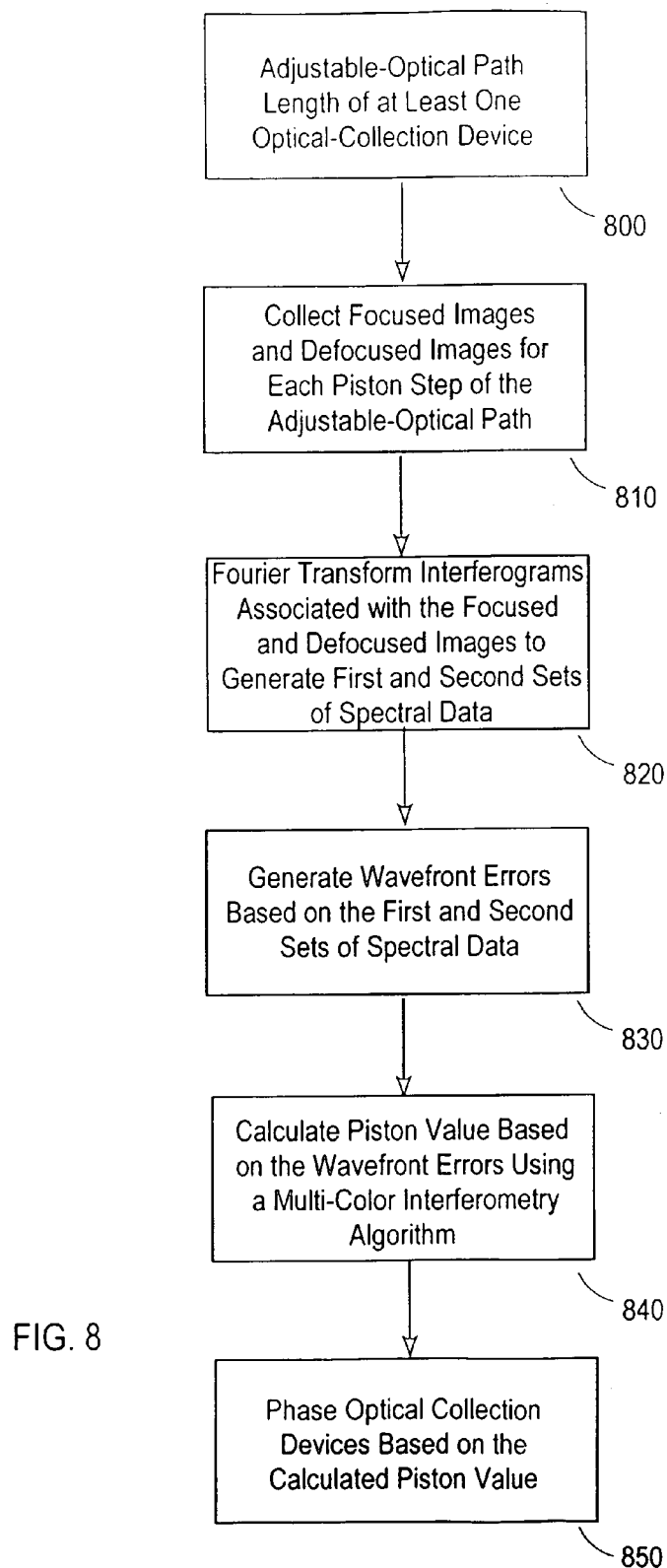
FIG. 8 is a high-lever flow chart having steps for phasing a plurality of pistoned optical-collection devices that form a collector portion of a multi-aperture telescope according to an embodiment of the present invention.

FIG. 8 is a high-level flow chart having steps for phasing a plurality of pistoned optical-collection devices that forms, for example, a collector portion of a multi-aperture telescope according to an embodiment of the present invention. Phasing is based on the piston information derived from wavefront potions of a wavefront, such that the wavefront portions are collected by the optical-collection devices. The high-level flowchart is merely illustrative of an embodiment incorporating the present invention and does not limit the scope of the invention as recited in the claims. One of ordinary skill in the art would recognize variations, modifications, and alternatives. At 800, an optical-path-delay mechanism pistons an adjustable-optical path of at least one of the optical-collection devices. The optical-path-delay mechanism pistons the optical-collection device through a plurality of steps. At 810, a set of focused images and a set of defocused images are collected for each step the optical-path-delay mechanism pistons an adjustable optical path of at least one of the optical-collection devices. The focused and defocused images may be captured by one or more image capture arrays. At 820, interferograms associated with the focused and defocused images are Fourier transformed to form a first set of spectral data associated with the focused images and to form a second set of spectral data associated with the defocused images. At 830, a set of wavefront errors is calculated from the first and second sets of spectral data. The wavefront errors are calculated using a phase diversity algorithm, such as the Gonsalves phase diversity algorithm. Each wavefront error is associated with a unique wavelength of electromagnetic radiation collected by the collector devices. At 840, a piston value for the optical-collection devices is calculated from the wavefront errors using a multi-color interferometry algorithm, such as a synthetic wavelength algorithm. The synthetic wavelength may be greater than the wavelengths of the collected electromagnetic radiation. For example, the synthetic wavelength may be written as $\Lambda=\lambda_1\lambda_2(\lambda_1-\lambda_2)$, wherein $\lambda_1$ is a first wavelength associated with one of the calculated wavefront errors and $\lambda_2$ is a second wavelength associated with another of the calculated wavefront errors. At 850, phase the optical-collection devices based on the calculated piston.

Figure 9:
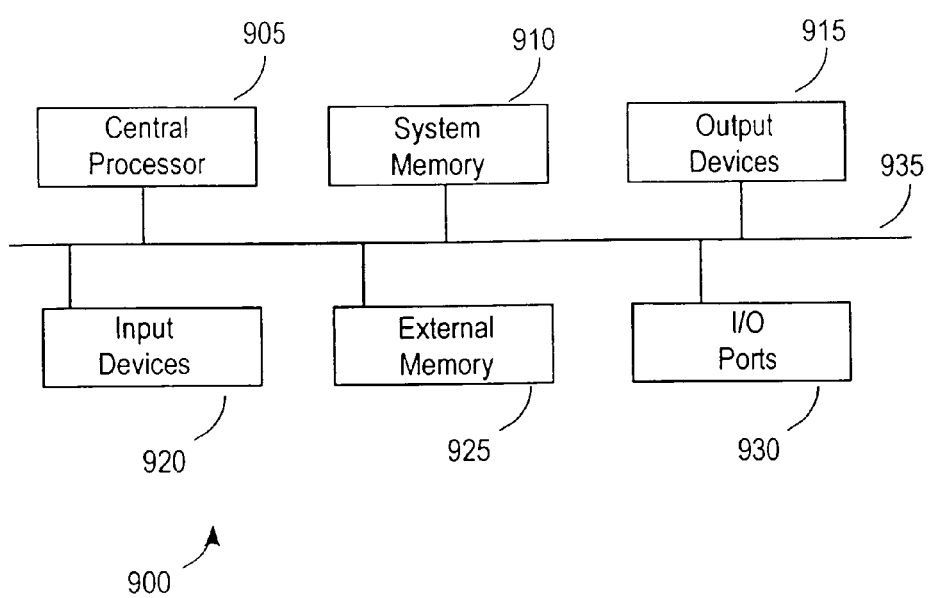
FIG. 9 is a block diagram of a computer system in which embodiments of a computation module may be implemented according to an embodiment of the present invention.

FIG. 9 is a block diagram of a computer system 900 in which embodiments of computation module 950 may be implemented. A specific embodiment of computation module 930 is implemented on a computer system 900 having a processor 905, a system memory 910, output devices 915, input devices 920, a disk memory 925, I/O (input output) ports 930 and an interconnecting device 935. Processor 905 may be implemented in a variety of formats, such as, but not limited to, a microprocessor, a microcontroller, a microcomputer, embedded logic or other processor types. Processor 905 may be a microprocessor manufactured, for example, by Intel Corporation, Motorola, Inc., or Advanced Micro Devices, Inc. System memory 910 may include EPROMs, EEPROMS, flash memory, SRAMs, DRAMs, cache memory and the like. Output devices 915 may include a variety of device types, such as CRTs, liquid-crystal display panels, printers, computer networks, an audio playback device and the like. Input devices 920 may include a variety of device types, such as a microphone, a keyboard, a computer network and the like. I/O ports 930 may include serial and parallel ports of various designs, such as skuzzy ports, universal serial buses (USB) and the like. It should be understood that computer 900 may be a local computer system, such as a personal computer, a distributed system with various modules located at a variety of locations connected by interconnect device 935 that may be a network, such as a WAN, a LAN, the Internet, or a PC system bus. A computer software program stored on system memory 910 and/or disk memory 925 is configured to generate machine code instructions that implement embodiments of computation module 225. While the foregoing describes embodiments of the computation module implemented in software, according to other embodiments the computation module may be implemented in hardware (such as in application specific (ASIC) semiconductor device or a programmable semiconductor device), firmware, control logic, or a combination of the foregoing.

Figure 10:
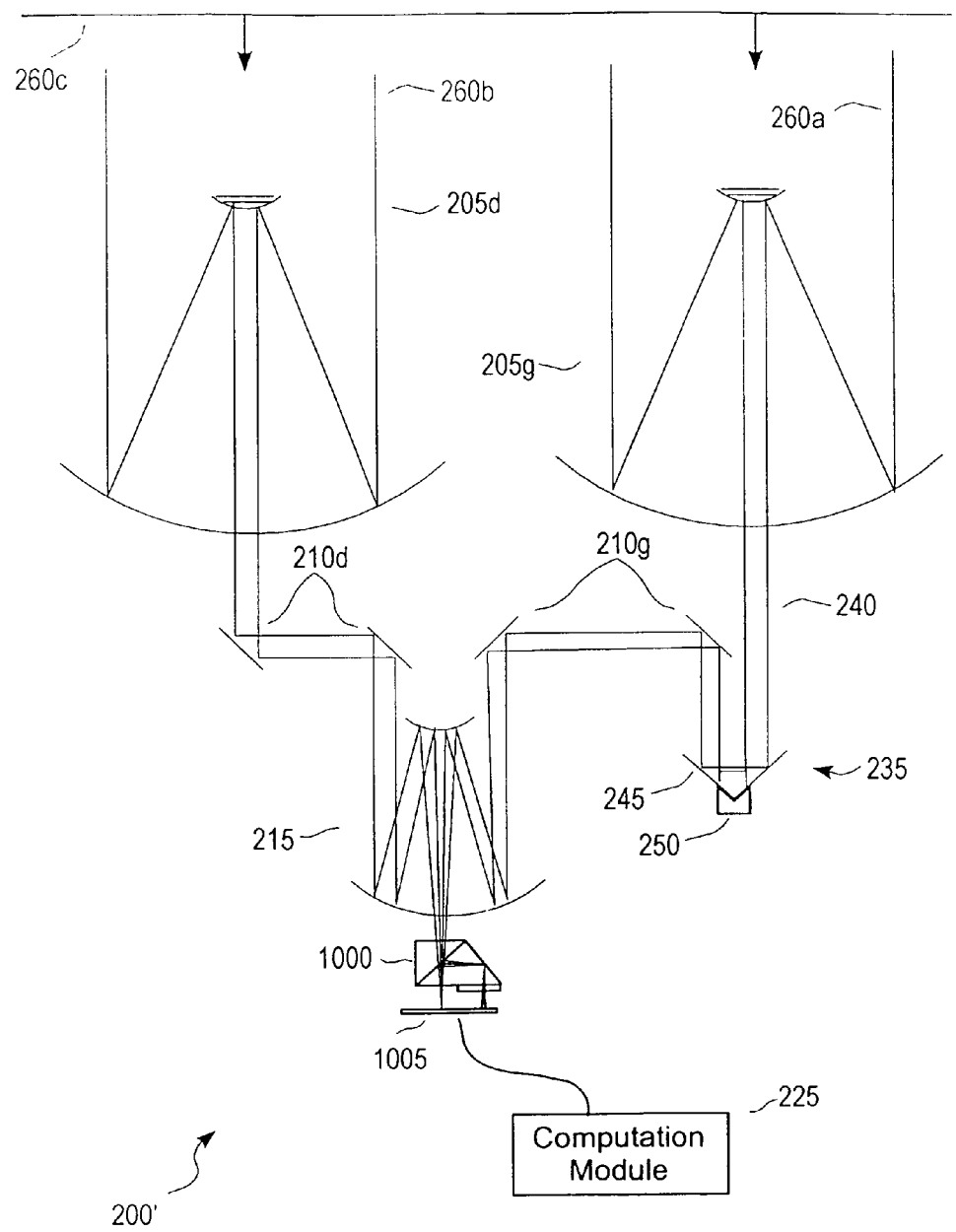
FIG. 10 is a simplified diagram of an optical system having a prism configured to transmit focused and defocused interference patterns onto a single image capture device.

It should also be understood that the examples and embodiments described herein are for illustrative purposes only and that various modifications or changes in view thereof will be suggested to persons skilled in the art and are to be included within the spirit and purview of this application and scope of the appended claims. For example, while optical system 200 has been described as including first and second image-capture arrays, a single image capture array may be used with an appropriately configured prism configured to produce delay to form the defocused images. FIG. 10 shows an optical system 200' having a prism 1000 configured to transmit focused and defocused interference patterns onto a single image capture device 1005 according to one embodiment of the present invention. Moreover, while embodiments described above are described as including a single Fourier transform module and a single phase diversity module, a number of Fourier transform modules and a number of phase diversity modules may be used for parallel processing according to various embodiments of the present invention. Therefore, the above description should not be taken as limiting the scope of the invention as defined by the claims. All publications, patents, and patent applications cited herein are hereby incorporated by reference for all purposes in their entirety.

What is claimed is:

1. A method for reducing a piston between a plurality of optical-collection devices configured to operate as a single optical device, such that the optical-collection devices are configured to capture select portions of wavefronts, the method comprising:
    pistoning an adjustable-optical path of at least one of the optical-collection devices through a plurality of steps;
    collecting a set of focused images and a set of defocused images for each step;
    Fourier transforming the first and second sets of images to generate respective first and second sets of spectral information for the wavefronts;
    deriving a set of wavefront errors based on the first and second sets of spectral information using a phase diversity algorithm; and
    deriving a piston value for the piston from the wavefront errors using a multi-color interferometry algorithm.

2. The method of claim 1, wherein each of the wavefront error is associated with a select wavelength of the wavefronts.

3. The method of claim 1, wherein the set of wavefront errors includes at least first and second wavefront errors respectively associated with first and second wavelengths of the wavefronts.

4. The method of claim 3, wherein the first and second wavelengths are less than the piston.

5. The method of claim 3, wherein the step of deriving the piston value includes:
    deriving a synthetic wavelength from at least the first and second wavelengths; and
    counting fringes of an interference pattern to determine the piston value.

6. The method of claim 5, wherein the synthetic wavelengths is larger than the first and second wavelengths.

7. The method of claim 5, wherein an expression for the synthetic wavelength is: $\Lambda = \lambda_1 \lambda_2 / (\lambda_1 - \lambda_2)$,
    wherein $\lambda_1$ is the first wavelength and $\lambda_2$ is the second wavelength.

8. The method of claim 1, wherein the optical-collection devices include sub-aperture telescopes forming a portion of a multi-aperture telescope.

9. The method of claim 1, wherein the optical-collection devices form a segmented primary collector.

10. The method of claim 1, wherein the phase diversity algorithm includes the Gonsalves algorithm.

11. The method of claim 1, wherein:
    collecting the focused images includes generating a first set of interferograms having sample points that correspond to the steps; and
    collecting the defocused images includes generating a second set of interferograms having sample points that correspond to the steps.

12. The method of claim 1, wherein the focused images include focused images of interference patterns.

13. The method of claim 1, wherein the defocused images include defocused images of defocused interference patterns.

14. The method of claim 1, wherein an amount of focus of the defocused images is known.

15. The method of claim 1, wherein collecting the set of focused images and the set of defocused images includes:
    combining the select portions of the wavefronts to form a combined beam;
    splitting the combined beam into first and second beams with a beam splitter;
    collecting the first beam at an image plane on a first image-capture array; and
    collecting the second beam a distance from the image plane on a second image-capture array.

16. The method of claim 15, wherein the first and second image-capture arrays are a single image-capture array.

17. The method of claim 1, further comprising reducing the piston of the optical-collection devices based on the piston value.

18. A method for reducing a displacement between a plurality of optical-collection devices configured to operate as a single optical device, such that the optical-collection devices are configured to capture select portions of wavefronts, the method comprising:

pistoning an adjustable-optical path of at least one of the optical-collection devices through a plurality of steps;

collecting a set of focused images and a set of defocused images for each of the steps;

Fourier transforming the first and second sets of images to derive respective first and second sets of spectral information for the wavefronts;

generating a plurality of visible indicators of the displacement from the first and second sets of spectral information using a metric; and interpreting the visible indicators to determine a value for the displacement, the value for the displacement referred to as a displacement value.

19. The method of claim 18, further comprising calculating the metric for a wavelength value associated with each of the steps.

20. The method of claim 18, wherein a value for the displacement is indicated by a uniform-visible indicator.

21. The method of claim 20, further comprising performing pattern recognition on the visible indictors to determine the uniform-visible indicator.

22. The method of claim 18, wherein the metric is a power metric.

23. The method of claim 22, wherein the power metric is represented by the equation $Mp=(G_0{}^*G_0-G_d{}^*G_d)/(G_0{}^*G_0+G_d{}^*G_d)$, wherein $G_0$ is a Fourier transform of an image function for the focused images and $G_d$ is a Fourier transform of an image function for the defocused images.

24. The method of claim 23, wherein an image function is the convolution of the object function and optical system point spread function.

25. A multi-aperture telescope comprising:

a plurality of sub-aperture telescopes, wherein at least one of the sub-aperture telescopes has an adjustable-optical path;

a Fourier transform module configured to transform focused and defocused image information collected by the sub-aperture telescopes and to generate spectral information from the focused and defocused image information;

a phase diversity module configured to derive wavefront errors from the focused and defocused image information; wherein the wavefront errors are associated with select wavelengths collected by the sub-aperture telescopes; and a multi-color interferometry module configured to derive a displacement value indicative of a displacement between at least first and second sub-aperture telescopes of the plurality of sub-aperture telescopes.

* * * * *